United States Patent
Ansari et al.

(10) Patent No.: US 11,056,686 B1
(45) Date of Patent: Jul. 6, 2021

(54) METHOD AND SYSTEM FOR WATER SOLUBLE WEAK ACIDIC RESINS AS CARBON PRECURSORS FOR SILICON-DOMINANT ANODES

(71) Applicant: Enevate Corporation, Irvine, CA (US)

(72) Inventors: Younes Ansari, Irvine, CA (US); Liwen Ji, San Diego, CA (US); Benjamin Park, Mission Viejo, CA (US)

(73) Assignee: Enevate Corporation, Irvine, CA (US)

( * ) Notice: Subject to any disclaimer, the term of this patent is extended or adjusted under 35 U.S.C. 154(b) by 0 days.

(21) Appl. No.: 16/896,872

(22) Filed: Jun. 9, 2020

(51) Int. Cl.
*H01M 4/38* (2006.01)
*H01M 4/04* (2006.01)
(Continued)

(52) U.S. Cl.
CPC ......... *H01M 4/386* (2013.01); *H01M 4/0404* (2013.01); *H01M 4/583* (2013.01);
(Continued)

(58) Field of Classification Search
CPC ............ H01M 10/0525; H01M 4/366; H01M 4/0404; H01M 4/0435; H01M 4/134; H01M 4/661; H01M 2004/021; H01M 4/0471; H01M 4/1395; H01M 4/621; H01M 4/622; H01M 4/625; H01M 4/667; H01M 10/056; H01M 10/0563; H01M 10/4235;
(Continued)

(56) References Cited

U.S. PATENT DOCUMENTS

| | | | |
|---|---|---|---|
| 9,997,765 B2 * | 6/2018 | Park | H01M 4/621 |
| 2012/0088150 A1 * | 4/2012 | Hwang | H01M 4/134 |
| | | | 429/211 |

(Continued)

OTHER PUBLICATIONS

H. Cho et al., Partially Carbonized Poly (Acrylic Acid) Grafted to Carboxymethyl Cellulose as an Advanced Binder for Si Anode in Li-ion Batteries, J. Electrochem. Sci. Technol., 2019, 10(2), pp. 131-138.

(Continued)

*Primary Examiner* — Adam A Arciero
(74) *Attorney, Agent, or Firm* — McAndrews, Held & Malloy, Ltd.

(57) ABSTRACT

Systems and methods for water soluble weak acidic resins as carbon precursors for silicon-dominant anodes may include an electrode coating layer on a current collector, where the electrode coating layer is formed from silicon and pyrolyzed water-soluble acidic polyamide imide as a primary resin carbon precursor. The electrode coating layer may include a pyrolyzed water-based acidic polymer solution additive. The polymer solution additive may include one or more of: polyacrylic acid (PAA) solution, poly (maleic acid, methyl methacrylate/methacrylic acid, butadiene/maleic acid) solutions, and water soluble polyacrylic acid. The electrode coating layer may include conductive additives. The current collector may include a metal foil, where the metal current collector includes one or more of a copper, tungsten, stainless steel, and nickel foil in electrical contact with the electrode coating layer. The electrode coating layer may be more than 70% silicon.

9 Claims, 8 Drawing Sheets

(51) Int. Cl.
*H01M 10/0525* (2010.01)
*H01M 4/66* (2006.01)
*H01M 10/0566* (2010.01)
*H01M 10/0565* (2010.01)
*H01M 4/583* (2010.01)
*H01M 10/0562* (2010.01)

(52) U.S. Cl.
CPC ....... *H01M 4/662* (2013.01); *H01M 10/0525* (2013.01); *H01M 10/0562* (2013.01); *H01M 10/0565* (2013.01); *H01M 10/0566* (2013.01); *H01M 2300/0082* (2013.01); *H01M 2300/0085* (2013.01)

(58) Field of Classification Search
CPC ... H01M 2300/002; H01M 2300/0094; H01M 10/0567; H01M 10/0568; H01M 10/0569; H01M 2300/0037; H01M 4/0411; H01M 4/13; H01M 4/139; Y02E 60/10; Y02E 60/122; Y10T 156/10; Y02P 70/50; Y02P 70/54; C07F 9/065; C07F 9/65815; C07F 9/659
See application file for complete search history.

(56) References Cited

U.S. PATENT DOCUMENTS

| | | | |
|---|---|---|---|
| 2014/0166939 A1* | 6/2014 | Park | H01M 4/0416 252/502 |
| 2014/0170475 A1* | 6/2014 | Park | H01M 4/0435 429/188 |
| 2014/0377635 A1* | 12/2014 | Matsumoto | H01M 4/622 429/163 |
| 2015/0017532 A1* | 1/2015 | Iguchi | C08F 114/22 429/217 |
| 2016/0156031 A1* | 6/2016 | Kim | H01M 4/386 429/218.1 |
| 2017/0155120 A1* | 6/2017 | Yoshimaru | H01M 10/0525 |
| 2019/0097235 A1* | 3/2019 | Murase | C08F 212/00 |
| 2020/0220154 A1* | 7/2020 | Xiao | H01M 4/0404 |

OTHER PUBLICATIONS

Z. Li et al. A new battery process technology inspired by partially carbonized polymer binders, Nano Energy 67 (2020) 104234, https://doi.org/10.1016/j.nanoen.2019.104234.

* cited by examiner

METHOD AND SYSTEM FOR WATER SOLUBLE WEAK ACIDIC RESINS AS CARBON PRECURSORS FOR SILICON-DOMINANT ANODES

CROSS-REFERENCE TO RELATED APPLICATIONS/INCORPORATION BY REFERENCE

N/A

FIELD

Aspects of the present disclosure relate to energy generation and storage. More specifically, certain embodiments of the disclosure relate to a method and system for water soluble weak acidic resins as carbon precursors for silicon-dominant anodes.

BACKGROUND

Conventional approaches for battery electrodes may cause electrode coating layers to lose contact with the electrode.

Further limitations and disadvantages of conventional and traditional approaches will become apparent to one of skill in the art, through comparison of such systems with some aspects of the present disclosure as set forth in the remainder of the present application with reference to the drawings.

BRIEF SUMMARY

A system and/or method for water soluble weak acidic resins as carbon precursors for silicon-dominant anodes, substantially as shown in and/or described in connection with at least one of the figures, as set forth more completely in the claims.

These and other advantages, aspects and novel features of the present disclosure, as well as details of an illustrated embodiment thereof, will be more fully understood from the following description and drawings.

DETAILED DESCRIPTION

Figure 1:
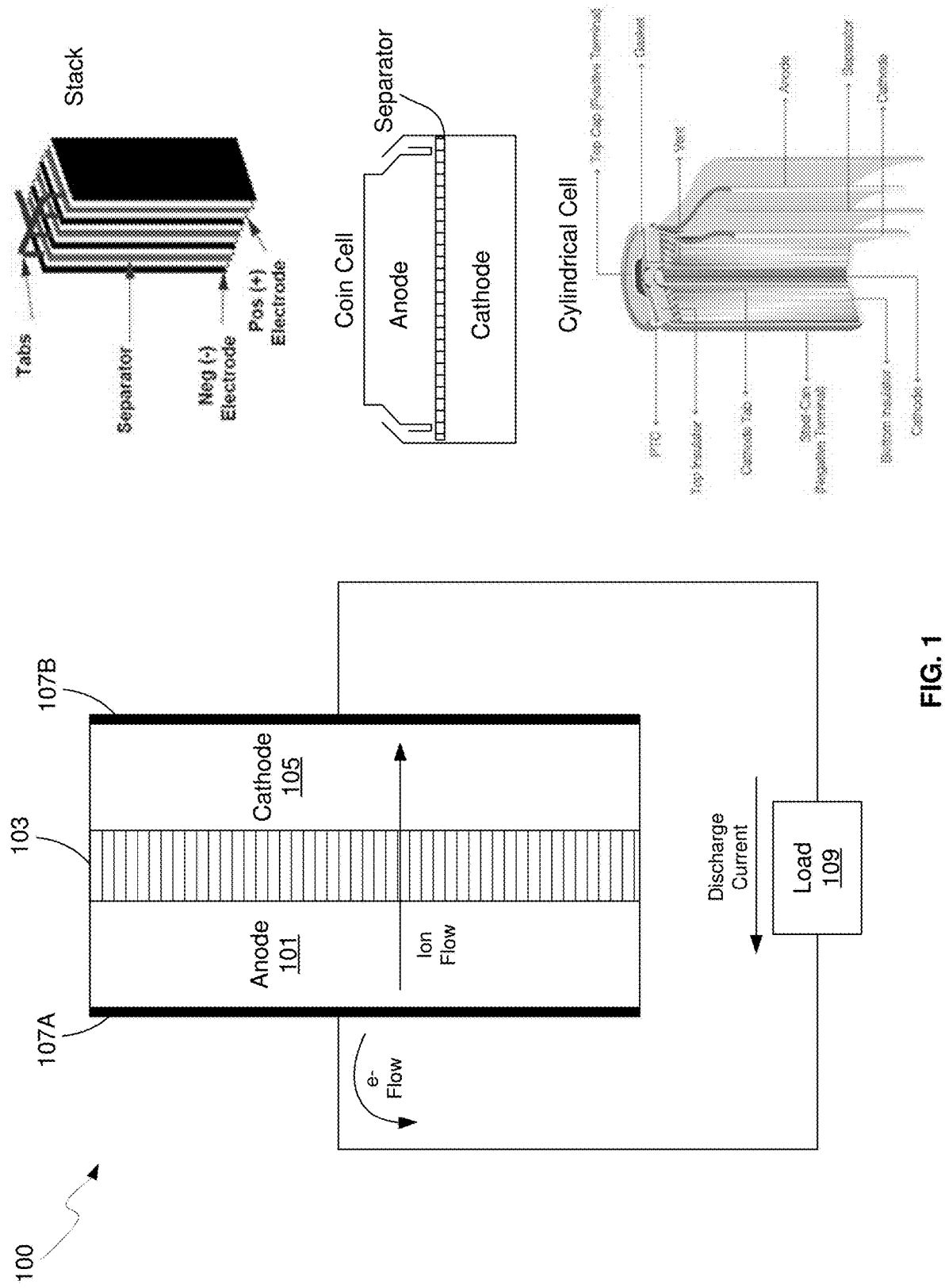
FIG. 1 is a diagram of a battery with a silicon-dominant anode, in accordance with an example embodiment of the disclosure.

FIG. 1 is a diagram of a battery with silicon-dominant anodes, in accordance with an example embodiment of the disclosure. Referring to FIG. 1, there is shown a battery 100 comprising a separator 103 sandwiched between an anode 101 and a cathode 105, with current collectors 107A and 107B. There is also shown a load 109 coupled to the battery 100 illustrating instances when the battery 100 is in discharge mode. In this disclosure, the term "battery" may be used to indicate a single electrochemical cell, a plurality of electrochemical cells formed into a module, and/or a plurality of modules formed into a pack. Furthermore, the cell shown in FIG. 1 is a very simplified example merely to show the principle of operation of a lithium ion cell. Examples of realistic structures are shown to the right in FIG. 1, where stacks of electrodes and separators are utilized, with electrode coatings typically on both sides of the current collectors. The stacks may be formed into different shapes, such as a coin cell, cylindrical cell, or prismatic cell, for example.

The development of portable electronic devices and electrification of transportation drive the need for high performance electrochemical energy storage. Small-scale (<100 Wh) to large-scale (>10 KWh) devices primarily use lithium-ion (Li-ion) batteries over other rechargeable battery chemistries due to their high-performance.

The anode 101 and cathode 105, along with the current collectors 107A and 107B, may comprise the electrodes, which may comprise plates or films within, or containing, an electrolyte material, where the plates may provide a physical barrier for containing the electrolyte as well as a conductive contact to external structures. In other embodiments, the anode/cathode plates are immersed in electrolyte while an outer casing provides electrolyte containment. The anode 101 and cathode are electrically coupled to the current collectors 107A and 107B, which comprise metal or other conductive material for providing electrical contact to the electrodes as well as physical support for the electrode coating layer in forming electrodes.

The configuration shown in FIG. 1 illustrates the battery 100 in discharge mode, whereas in a charging configuration, the load 107 may be replaced with a charger to reverse the process. In one class of batteries, the separator 103 is generally a film material, made of an electrically insulating polymer, for example, that prevents electrons from flowing from anode 101 to cathode 105, or vice versa, while being porous enough to allow ions to pass through the separator 103. Typically, the separator 103, cathode 105, and anode 101 materials are individually formed into sheets, films, or electrode coating layer coated foils. Sheets of the cathode, separator and anode are subsequently stacked or rolled with the separator 103 separating the cathode 105 and anode 101 to form the battery 100. In some embodiments, the separator 103 is a sheet and generally utilizes winding methods and stacking in its manufacture. In these methods, the anodes, cathodes, and current collectors (e.g., electrodes) may comprise films.

In an example scenario, the battery 100 may comprise a solid, liquid, or gel electrolyte. The separator 103 preferably does not dissolve in typical battery electrolytes such as compositions that may comprise: Ethylene Carbonate (EC), Fluoroethylene Carbonate (FEC), F2EC, VC, Propylene Carbonate (PC), Dimethyl Carbonate (DMC), Ethyl Methyl Carbonate (EMC), Diethyl Carbonate (DEC), etc. with dissolved $LiBF_4$, $LiAsF_6$, $LiPF_6$, LiTFSI, LiFSI, LiDFOB, LiBOB, LiTDI, and $LiClO_4$ etc. The separator 103 may be wet or soaked with a liquid or gel electrolyte. In addition, in an example embodiment, the separator 103 does not melt below about 100 to 120° C., and exhibits sufficient mechanical properties for battery applications. A battery, in operation, can experience expansion and contraction of the anode and/or the cathode. In an example embodiment, the separator 103 can expand and contract by at least about 5 to 10% without failing, and may also be flexible.

The separator 103 may be sufficiently porous so that ions can pass through the separator once wet with, for example, a liquid or gel electrolyte. Alternatively (or additionally), the separator may absorb the electrolyte through a gelling or other process even without significant porosity. The porosity of the separator 103 is also generally not too porous to allow the anode 101 and cathode 105 to transfer electrons through the separator 103.

The anode 101 and cathode 105 comprise electrodes for the battery 100, providing electrical connections to the device for transfer of electrical charge in charge and discharge states. The anode 101 may comprise silicon, carbon, or combinations of these materials, for example. Typical anode electrodes comprise a carbon material that includes a current collector such as a copper sheet. Carbon is often used because it has excellent electrochemical properties and is also electrically conductive. Anode electrodes currently used in rechargeable lithium-ion cells typically have a specific capacity of approximately 200 milliamp hours per gram. Graphite, the electrode coating layer used in most lithium ion battery anodes, has a theoretical energy density of 372 milliamp hours per gram (mAh/g). In comparison, silicon has a high theoretical capacity of 4200 mAh/g. In order to increase volumetric and gravimetric energy density of lithium-ion batteries, silicon may be used as the electrode coating layer for the cathode or anode. Silicon anodes may be formed from silicon composites, with more than 50% silicon, for example.

In an example scenario, the anode 101 and cathode 105 store the ion used for separation of charge, such as lithium. In this example, the electrolyte carries positively charged lithium ions from the anode 101 to the cathode 105 in discharge mode, as shown in FIG. 1 for example, and vice versa through the separator 105 in charge mode. The movement of the lithium ions creates free electrons in the anode 101 which creates a charge at the positive current collector 107B. The electrical current then flows from the current collector through the load 109 to the negative current collector 107A. The separator 103 blocks the flow of electrons inside the battery 100, allows the flow of lithium ions, and prevents direct contact between the electrodes.

While the battery 100 is discharging and providing an electric current, the anode 101 releases lithium ions to the cathode 105 via the separator 103, generating a flow of electrons from one side to the other via the coupled load 109. When the battery is being charged, the opposite happens where lithium ions are released by the cathode 105 and received by the anode 101.

The materials selected for the anode 101 and cathode 105 are important for the reliability and energy density possible for the battery 100. The energy, power, cost, and safety of current Li-ion batteries need to be improved in order to, for example, compete with internal combustion engine (ICE) technology and allow for the widespread adoption of electric vehicles (EVs). High energy density, high power density, and improved safety of lithium-ion batteries are achieved with the development of high-capacity and high-voltage cathodes, high-capacity anodes and functionally non-flammable electrolytes with high voltage stability and interfacial compatibility with electrodes. In addition, materials with low toxicity are beneficial as battery materials to reduce process cost and promote consumer safety.

The performance of electrochemical electrodes, while dependent on many factors, is largely dependent on the robustness of electrical contact between electrode particles, as well as between the current collector and the electrode particles. The electrical conductivity of silicon anode electrodes may be manipulated by incorporating conductive additives with different morphological properties. Carbon black (SuperP), vapor grown carbon fibers (VGCF), and a mixture of the two have previously been incorporated separately into the anode electrode resulting in improved performance of the anode. The synergistic interactions between the two carbon materials may facilitate electrical contact throughout the large volume changes of the silicon anode during charge and discharge.

State-of-the-art lithium-ion batteries typically employ a graphite-dominant anode as an intercalation material for lithium. With demand for lithium-ion battery performance improvements such as higher energy density and fast-charging, silicon is being added as an electrode coating layer or even completely replacing graphite as a dominant anode material. Most electrodes that are considered "silicon anodes" in the industry are graphite anodes with silicon added in small quantities (typically <20%). These graphite-silicon mixture anodes must utilize the graphite, which has a lower lithiation voltage compared to silicon; the silicon has to be nearly fully lithiated in order to utilize the graphite. Therefore, these electrodes do not have the advantage of a silicon or silicon composite anode where the voltage of the electrode is substantially above 0V vs Li/Li+ and thus are less susceptible to lithium plating. Furthermore, these electrodes can have significantly higher excess capacity on the silicon versus the opposite electrode to further increase the robustness to high rates.

Silicon-based anodes have a lithiation/delithiation voltage plateau at about 0.3-0.4V vs. Li/Li+, which allows it to maintain an open circuit potential that avoids undesirable Li plating and dendrite formation. While silicon shows excellent electrochemical activity, achieving a stable cycle life for silicon-based anodes is challenging due to silicon's large volume changes during lithiation and delithiation. Silicon regions may lose electrical contact from the anode as large volume changes coupled with its low electrical conductivity separate the silicon from surrounding materials in the anode.

In addition, the large silicon volume changes exacerbate solid electrolyte interphase (SEI) formation, which can further lead to electrical isolation and, thus, capacity loss. Expansion and shrinkage of silicon particles upon charge-discharge cycling causes pulverization of silicon particles, which increases their specific surface area. As the silicon surface area changes and increases during cycling, SEI repeatedly breaks apart and reforms. The SEI thus continually builds up around the pulverizing silicon regions during cycling into a thick electronic and ionic insulating layer. This accumulating SEI increases the impedance of the electrode and reduces the electrode electrochemical reactivity, which is detrimental to cycle life.

Therefore, there is a trade-off among the functions of active materials, conductive additives and polymer binders. The balance may be adversely impacted by high energy density silicon anodes with low conductivity and huge volume variations described above. This disclosure address this issue through the use of water soluble acidified PAI (5-8%) and various stabilizing additives such as polyacrylic acid (PAA) solution, poly (maleic acid, methyl methacrylate/methacrylic acid, butadiene/maleic acid) solutions, water soluble carboxyl acid group containing (co)polyimide solution, and other soluble polymers containing carboxyl acid groups. Water-soluble PAI (WPAI) material has a PAI backbone, but the polymer is functionalized with acidic groups to allow the polymer to dissolve in water, so WPAI is a PAI analog with acidified sidechains. Water-soluble acidified PAI and water-based acidic polymer solution additive anodes provide the benefits of improved cycle life, increased energy density, increased power density, improved flexibility, improved adhesion, and reduced cost.

Figure 2A:
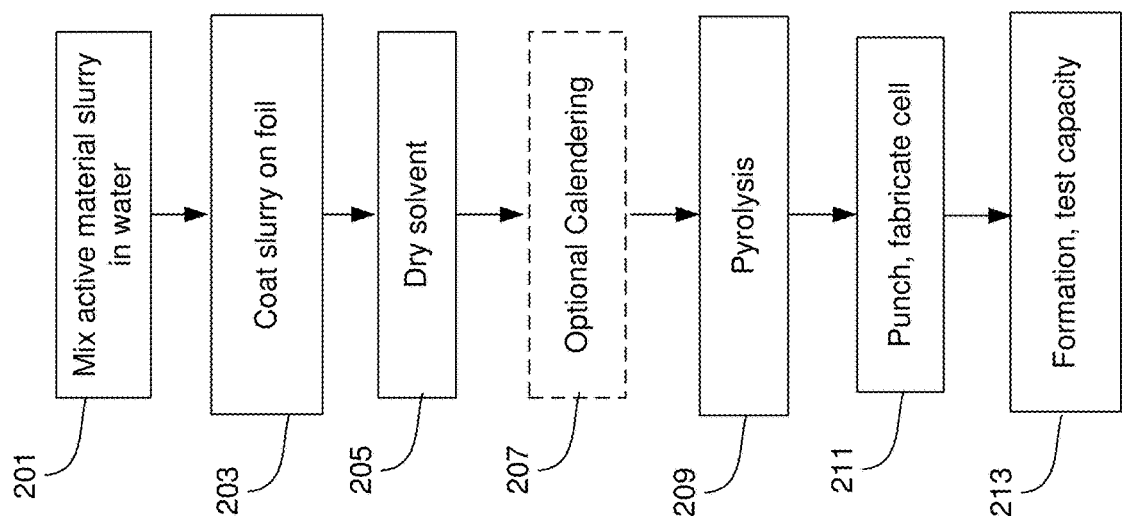
FIG. 2A is a flow diagram of a direct coating process for fabricating a cell with a silicon-dominant electrode, in accordance with an example embodiment of the disclosure.

FIG. 2A is a flow diagram of a direct coating process for fabricating a cell with a silicon-dominant electrode, in accordance with an example embodiment of the disclosure. This process comprises physically mixing the electrode coating layer and conductive additive together, and coating it directly on a current collector as opposed to forming the electrode coating layer on a substrate and then laminating it on a current collector. This strategy may also be adopted by other anode-based cells, such as graphite, conversion type anodes, such as transition metal oxides, transition metal phosphides, and other alloy type anodes, such as Sn, Sb, Al, P, etc.

In step 201, the raw electrode coating layer may be mixed to form a slurry with stable viscosities of more than 1500 cp by using water-soluble acidified PAIs (WPAI) and water-based acidic polymer solution additives. The addition of the polymer solution additive enables the adjustment of the viscosity of the polymer and homogenization of the slurry. The fabricated anode shows superior adhesion to copper, a remarkable cohesion, and exceptional flexibility. This anode is shown to be capable of fast charging and performs similar or better than current anodes.

The particle size and mixing times may be varied to configure the electrode coating layer density and/or roughness. Furthermore, cathode electrode coating layers may be mixed in step 201, where the electrode coating layer may comprise lithium cobalt oxide (LCO), lithium iron phosphate, lithium nickel cobalt manganese oxide (NMC), Ni-rich lithium nickel cobalt aluminum oxide (NCA), lithium manganese oxide (LMO), lithium nickel manganese spinel, LFP, Li-rich layer cathodes, LNMO or similar materials or combinations thereof, mixed with carbon precursor and additive as described above for the anode electrode coating layer.

Figure 3:
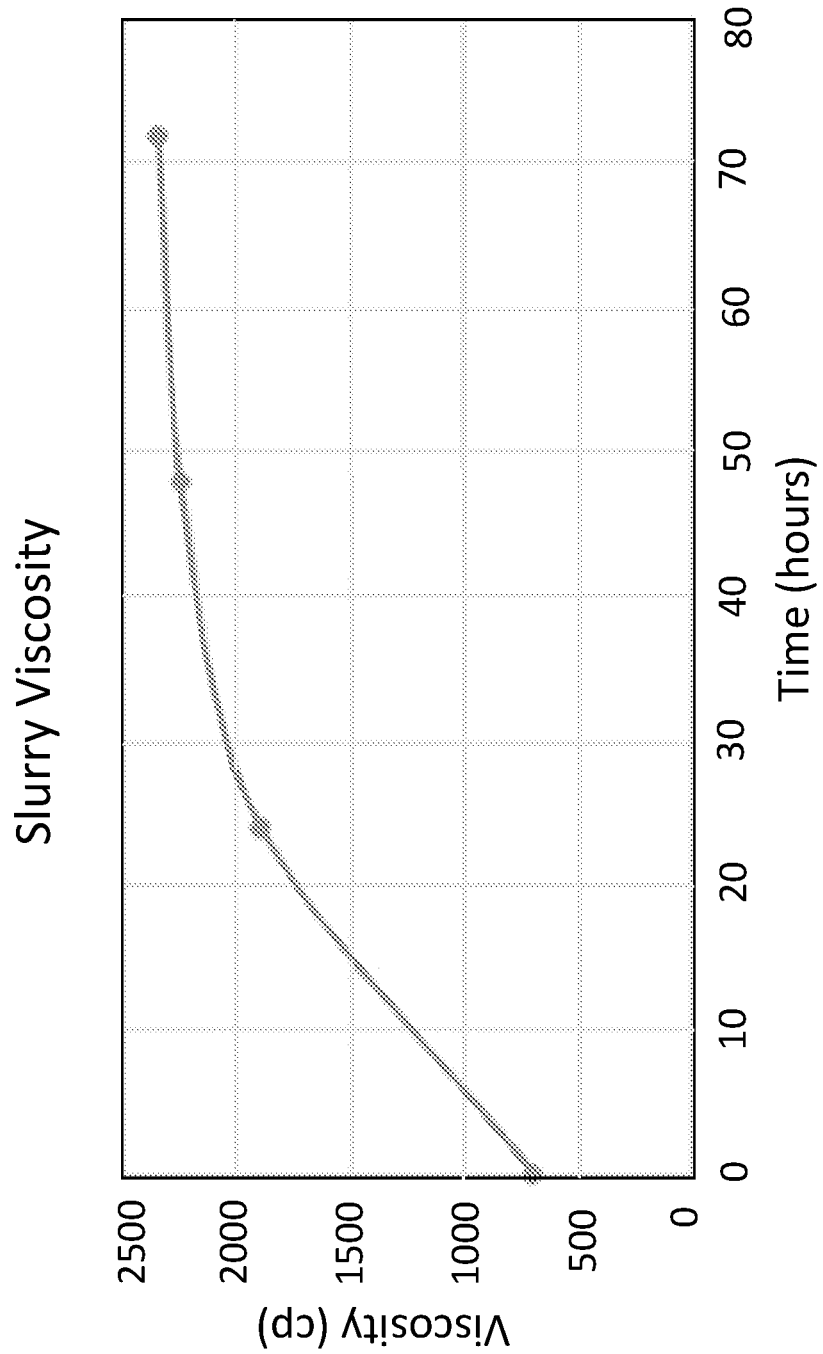
FIG. 3 illustrates slurry viscosity versus mixing time, in accordance with an example embodiment of the disclosure.

In an example embodiment, for a silicon-dominant anode, 30-40 grams of dry WPAI, 15-25 grams of a basic amine such as butyldiethanolamine or triethanolamine, and 400-500 grams of water may be mixed at high temperature to form a solution. Then, 30-50 grams of this solution may be mixed with 5-20 grams of silicon microparticles (~10-12 μm) plus 0.2-0.5 grams of PAA 12% solution in water as additive, and 4-8 grams of water. The mixture may be mixed using a low shear mixer or a centrifugal speed mixer, where FIG. 3 shows the changes in the viscosity of the solution versus mixing time.

In step 203, the as-prepared slurry may be coated on a copper foil, 20 μm thick in this example, and in step 205 may be dried at 130° C. in a convection oven to dry the coating and form the green anode. Similarly, cathode electrode coating layers may be coated on a foil material, such as aluminum, for example.

An optional calendering process may be utilized in step 207 where a series of hard pressure rollers may be used to finish the film/substrate into a smoother and denser sheet of material.

In step 209, the electrode coating layer may be pyrolyzed by heating to 500-800° C., 650° C. in this example, in an inert atmosphere such that carbon precursors are partially or completely converted into conductive carbon. The pyrolysis step may result in a anode electrode coating layer having silicon content greater than or equal to 50% by weight, where the anode has been subjected to heating at or above 400 degrees Celsius.

Pyrolysis can be done either in roll form or after punching in step 211. If done in roll form, the punching is done after the pyrolysis process. In instances where the current collector foil is not pre-punched/pre-perforated, the formed electrode may be perforated with a punching roller, for example. The punched electrodes may then be sandwiched with a separator and electrolyte to form a cell. In step 213, the cell may be subjected to a formation process, comprising initial charge and discharge steps to lithiate the anode, with some residual lithium remaining, and the cell capacity may be assessed.

Figure 2B:
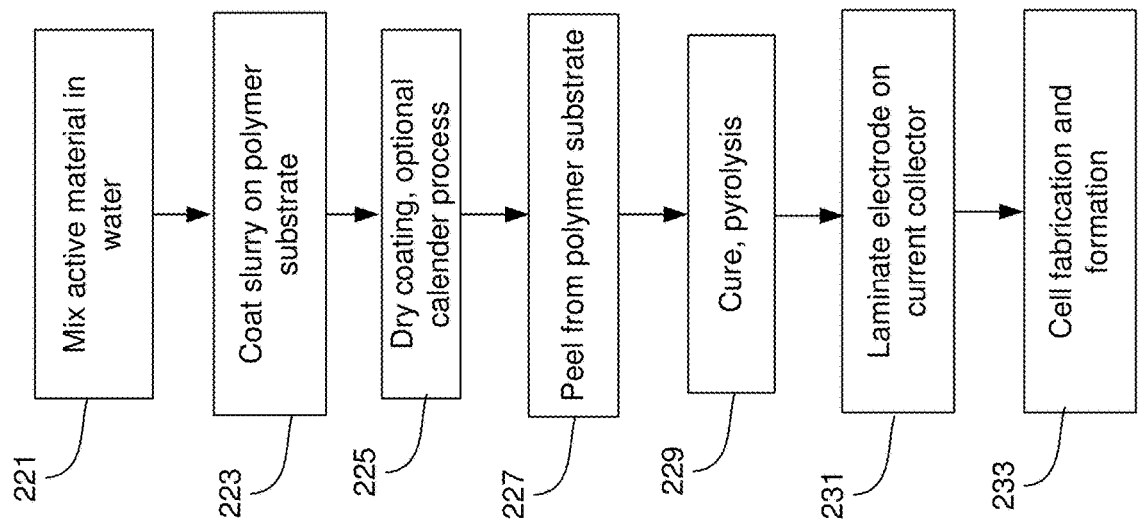
FIG. 2B is a flow diagram for of an alternative process for lamination of electrodes, in accordance with an example embodiment of the disclosure.

FIG. 2B is a flow diagram of an alternative process for lamination of electrodes, in accordance with an example embodiment of the disclosure. While the previous process to fabricate composite anodes employs a direct coating process, this process physically mixes the active material, conductive additive, and binder together coupled with peeling and lamination processes.

This process is shown in the flow diagram of FIG. 2B, starting with step 221 where the raw electrode coating layer may be mixed to form a slurry with stable viscosities of more than 1500 cp by using water-soluble acidified PAIs (WPAI) and water-based acidic polymer solution additives. The addition of the polymer solution additive enables the adjustment of the viscosity of the polymer and homogenization of the slurry.

The particle size and mixing times may be varied to configure the electrode coating layer density and/or roughness. Furthermore, cathode electrode coating layers may be mixed in step 221, where the electrode coating layer may comprise lithium cobalt oxide (LCO), lithium iron phosphate, lithium nickel cobalt manganese oxide (NMC), Ni-rich lithium nickel cobalt aluminum oxide (NCA), lithium manganese oxide (LMO), lithium nickel manganese spinel, LFP, Li-rich layer cathodes, LNMO or similar materials or combinations thereof, mixed with carbon precursor and additive as described above for the anode electrode coating layer.

In an example embodiment, for a silicon-dominant anode, 30-40 grams of dry WPAI, 15-25 grams of a basic amine such as butyldiethanolamine or triethanolamine, and 400-500 grams of water may be mixed at high temperature to form a solution. Then, 30-50 grams of this solution may be mixed with 5-20 grams of silicon microparticles (~10-12 μm) plus 0.2-0.5 grams of PAA 12% solution in water as additive, and 4-8 grams of water. The mixture may be mixed using a low shear mixer or a centrifugal speed mixer, where FIG. 3 shows the changes in the viscosity of the solution versus mixing time.

In step 223, the slurry may be coated on a polymer substrate, such as polyethylene terephthalate (PET), polypropylene (PP), or Mylar. The slurry may be coated on the PET/PP/Mylar film at a loading of 3-6 mg/cm$^2$ for the anode and 15-35 mg/cm$^2$ for the cathode, and then dried in step 225. An optional calendering process may be utilized where a series of hard pressure rollers may be used to finish the film/substrate into a smoothed and denser sheet of material.

In step 227, the green film may then be removed from the PET, where the active material may be peeled off the polymer substrate, the peeling process being optional for a polypropylene (PP) substrate, since PP can leave ~2% char residue upon pyrolysis. The peeling may be followed by a cure and pyrolysis step 229 where the film may be cut into sheets, and vacuum dried using a two-stage process (100-140° C. for 14-16 hours, 200-240° C. for 4-6 hours). The dry film may be thermally treated at 1000-1300° C. to convert the polymer matrix into carbon.

In step 231, the pyrolyzed material may be flat press or roll press laminated on the current collector, where for aluminum foil for the cathode and copper foil for the anode may be pre-coated with polyamide-imide with a nominal loading of 0.35-0.75 mg/cm$^2$ (applied as a 5-7 wt % varnish in NMP, dried 10-20 hour at 100-140° C. under vacuum). In flat press lamination, the active material composite film may be laminated to the coated aluminum or copper using a heated hydraulic press (30-70 seconds, 250-350° C., and 3000-5000 psi), thereby forming the finished composite electrode. In another embodiment, the pyrolyzed material may be roll-press laminated to the current collector.

In step 233, the electrodes may then be sandwiched with a separator and electrolyte to form a cell. The cell may be subjected to a formation process, comprising initial charge and discharge steps to lithiate the anode, with some residual lithium remaining, and testing to assess cell performance.

FIG. 3 illustrates slurry viscosity versus mixing time, in accordance with an example embodiment of the disclosure. The plot indicates that a slurry with stable viscosity can be achieved using WPAI as the carbon precursor, where a viscosity of 1500 centipoise (cp) may be obtained after ~15 hours with this mixture. The polymer additive may play a role in linking long chain PAIs together and as a result increases the viscosity of the solution.

Figure 4:
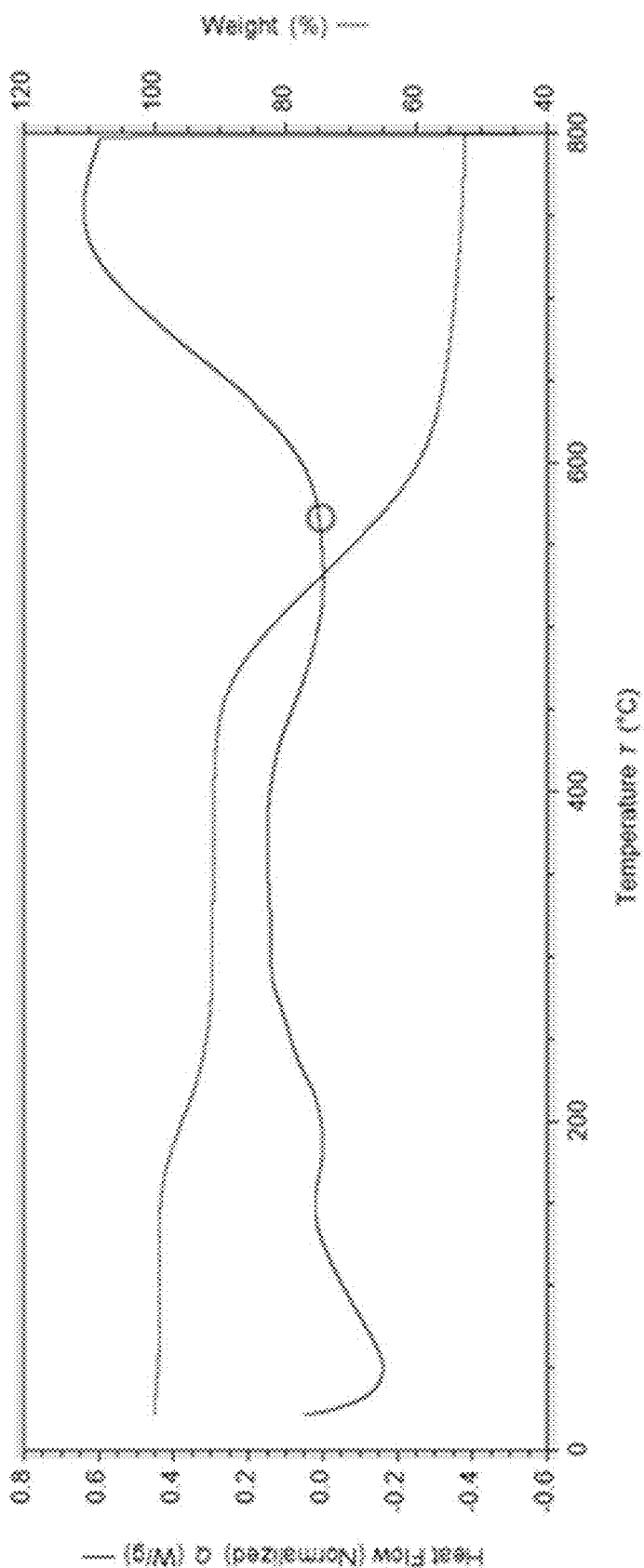
FIG. 4 illustrates the results of thermal gravimetric analysis (TGA) of dry WPAI, in accordance with an example embodiment of the disclosure.

FIG. 4 illustrates the results of thermal gravimetric analysis (TGA) of dry WPAI, in accordance with an example embodiment of the disclosure. The TGA analysis may be performed under nitrogen atmosphere with a flow rate of 100 sccm and temperature ramp rate of 5° C./min. The plot shows the weight percentage remaining and the normalized heat flow provided to the material in W/g over a temperature range up to 800° C. The TGA analysis indicates that the polymer has ~58% char yield at 650° C. and more than 53% char yield at 800° C.

Figure 5:
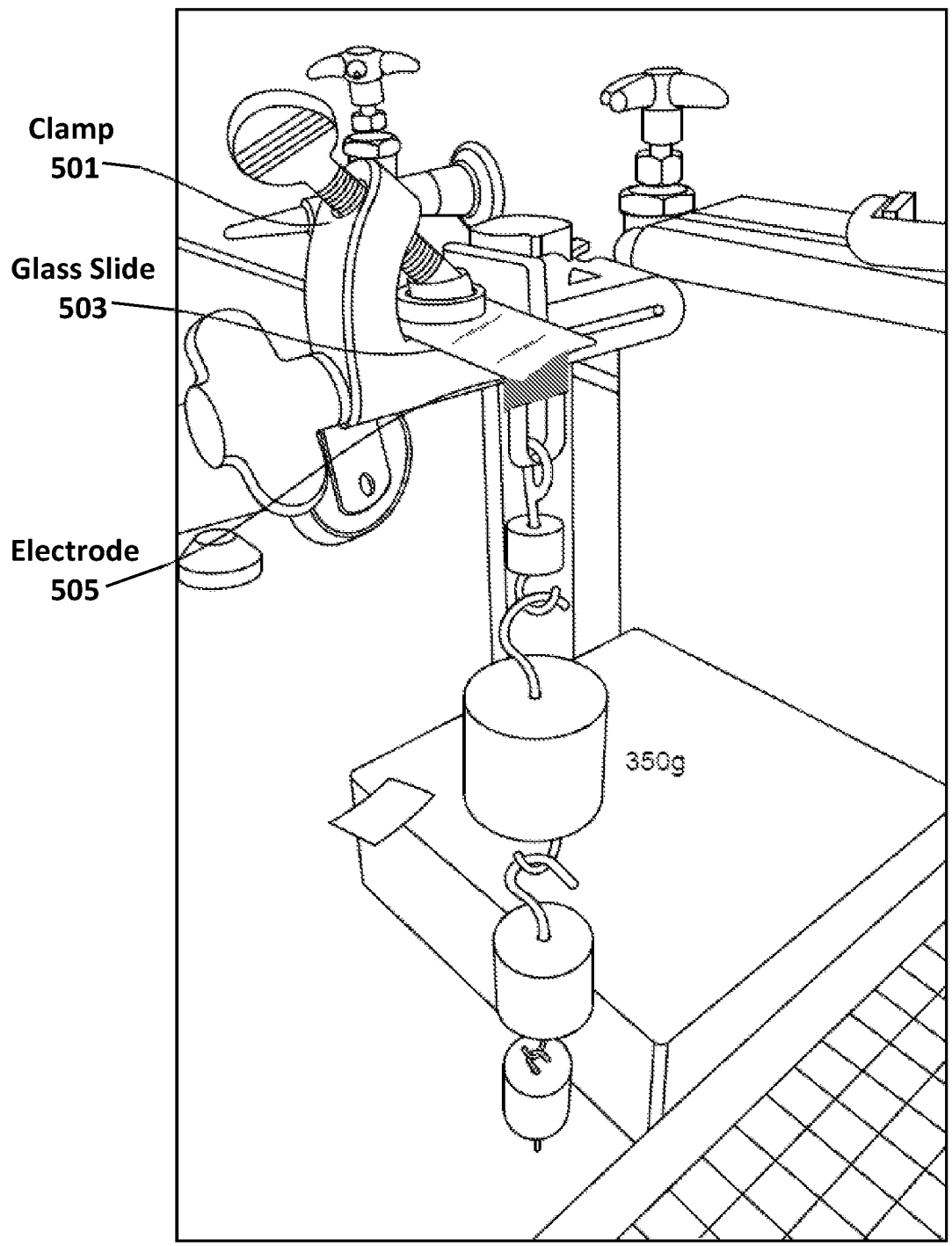
FIG. 5 illustrates an adhesion test for a silicon-dominant anode with water-soluble acidified PAI and water-based acidic polymer solution additive, in accordance with an example embodiment of the disclosure.

FIG. 5 illustrates an adhesion test for a silicon-dominant anode with water-soluble acidified PAI and water-based acidic polymer solution additive, in accordance with an example embodiment of the disclosure. The test setup includes a clamp 501 for holding an electrode 505 fastened to a glass slide 503 using adhesive tape (not visible) holding the anode on one side on the other is a double sided adhesive tape (not visible) for coupling to weights.

The anode shows a superior adhesion strength, with capability of holding 350 grams of weights before the coating detaches from the copper. Such adhesion is much higher than most anodes which mostly fail to hold more than 50 grams of weights.

Figure 6:
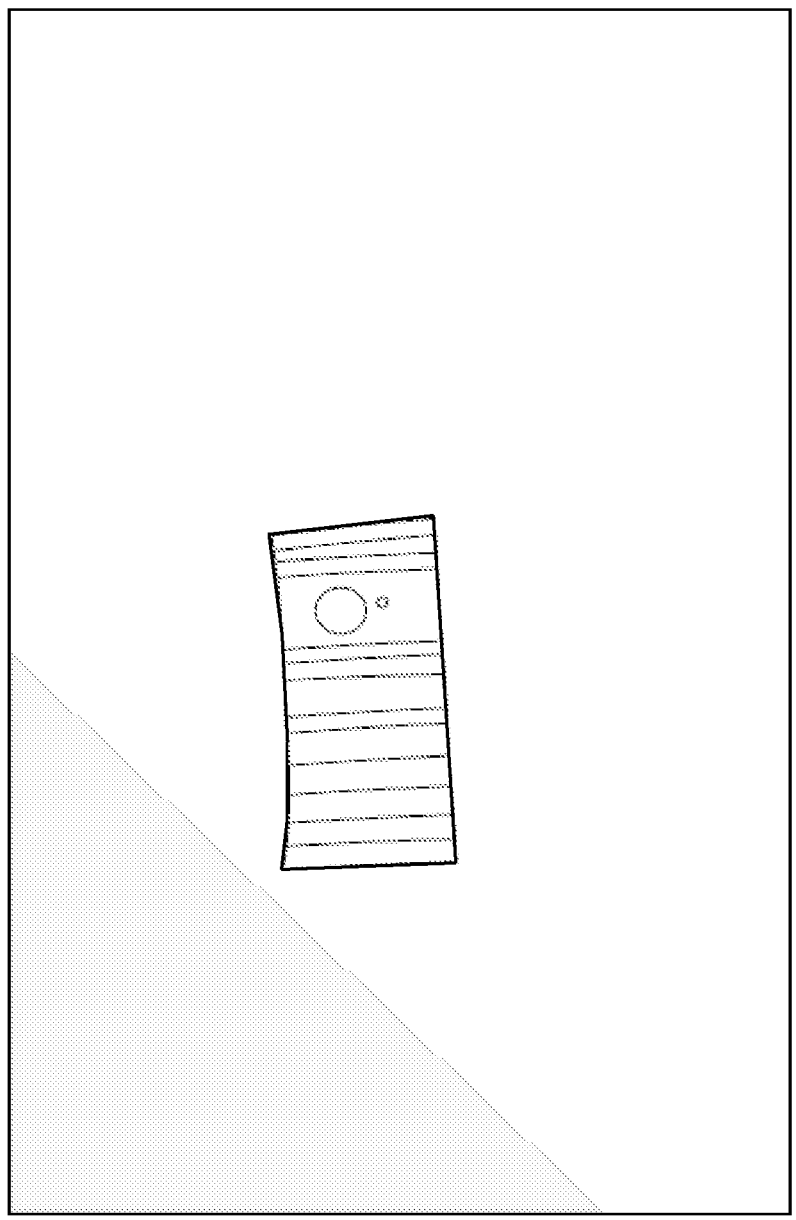
FIG. 6 illustrates a silicon-dominant anode after a winding test, in accordance with an example embodiment of the disclosure.

FIG. 6 illustrates a silicon-dominant anode after a winding test, in accordance with an example embodiment of the disclosure. In this example, the anode is wrapped around a 4 mm mandrel in order to test the feasibility of using it for cylindrical cells. As it can be seen from FIG. 6, the anode shows only minor cracks, no copper exposures due to carbon detachments, and no flaking. Therefore, such a remarkable flexibility and anode integrity indicates that the water-based slurry anode is appropriate for use in cylindrical cells.

Figure 7:
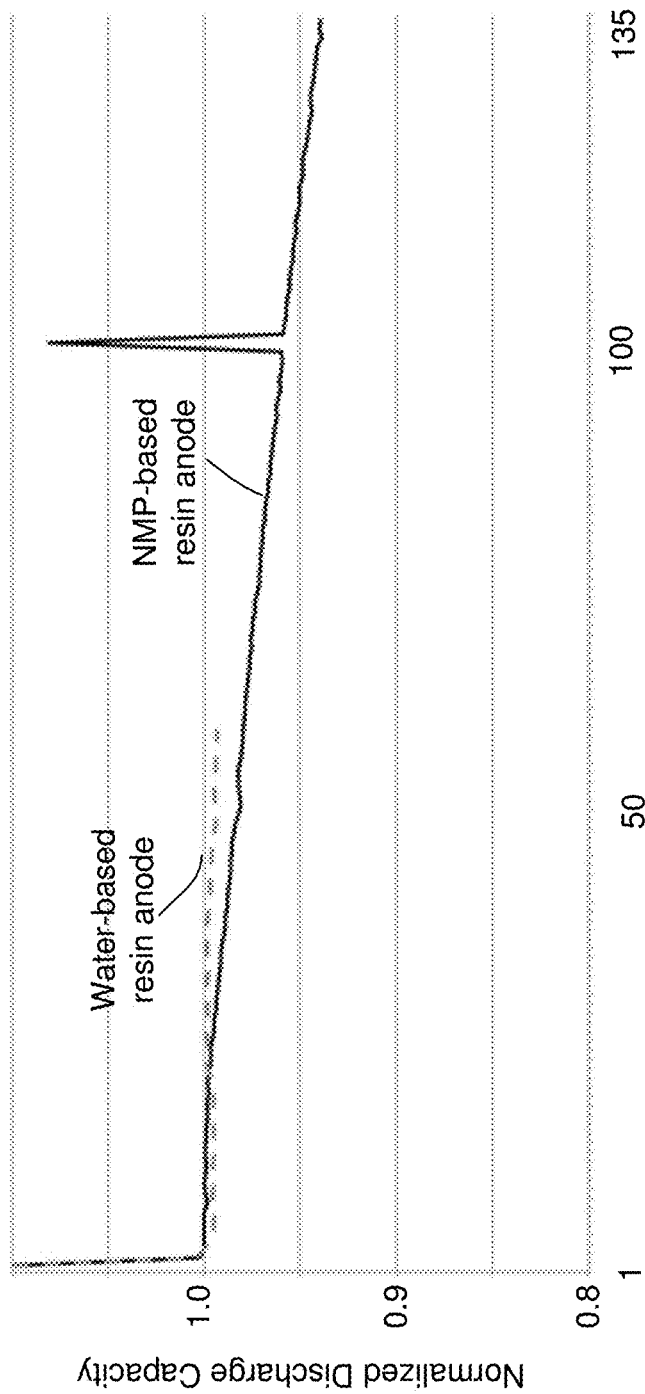
FIG. 7 illustrates normalized discharge capacity of a cell with water-soluble acidified PAI and water-based acidic polymer solution additive anode compared to a standard cell with NMP-based slurry laminated anode, in accordance with an example embodiment of the disclosure.

FIG. 7 illustrates normalized discharge capacity of a cell with water-soluble acidified PAI and water-based acidic polymer solution additive anode compared to a standard cell with NMP-based resin laminated anode, in accordance with an example embodiment of the disclosure. The plot compares the normalized capacity retention of the standard anode (solid line—anode laminated on a current collector with an adhesive) versus the water-soluble acidified PAI and water-based acidic polymer solution additive anode (dashed line). The NMP-based resin anode may be laminated on a copper foil coated with PAI adhesive, as opposed to the direct-coated water-based resin anode.

While the absolute capacity values indicate that both anodes have similar capacities, the normalized capacity values shown indicate that the water-soluble acidified PAI anode demonstrates a better capacity retention compared with the standard anode. The standard anode in this example is a free standing pyrolyzed coupon that is laminated on adhesive-coated copper. As can be seen in FIG. 7, the water-soluble acidified PAI anode is still at near 100% discharge capacity after 60 cycles. In addition to improved cycle life, water-soluble acidified PAI and water-based acidic polymer solution additive anodes demonstrate increased energy density, increased power density, improved flexibility, improved adhesion, and reduced cost using water soluble acidified PAI.

In an example embodiment of the disclosure, a method and system is described for water soluble weak acidic resins as carbon precursors for silicon-dominant anodes. The battery electrode may comprise an electrode coating layer on a current collector, where the electrode coating layer is formed from silicon and pyrolyzed water-soluble acidic polyamide imide resin carbon precursor. The electrode coating layer may comprise a pyrolyzed water-based acidic polymer solution additive. The polymer solution additive may comprise one or more of: polyacrylic acid (PAA) solution, poly (maleic acid, methyl methacrylate/methacrylic acid, butadiene/maleic acid) solutions, and water soluble PAA. The electrode coating layer may comprise conductive additives. The current collector may comprise a metal foil, where the metal current collector comprises one or more of a copper, tungsten, stainless steel, and nickel foil in electrical contact with the electrode coating layer. The electrode coating layer may comprise more than 70% silicon. The electrode may be in electrical and physical contact with an electrolyte, where the electrolyte comprises a liquid, solid, or gel. The battery electrode may be in a lithium ion battery.

As utilized herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations. As utilized herein, a battery, circuitry or a device is "operable" to perform a function whenever the battery, circuitry or device comprises the necessary hardware and code (if any is necessary) or other elements to perform the function, regardless of whether performance of the function is disabled or not enabled (e.g., by a user-configurable setting, factory trim, configuration, etc.).

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method of forming an electrode, the method comprising:
   fabricating a battery electrode comprising an electrode coating layer on a current collector, the electrode coating layer formed from silicon and a water-soluble polyamide imide functionalized with acidic groups as a primary resin carbon precursor;
   and pyrolyzing said electrode coating layer by heating to 500-800° C. to form the battery electrode.

2. The method according to claim 1, wherein the electrode coating layer further comprises a water-based acidic polymer solution additive.

3. The method according to claim 2, wherein the polymer solution additive comprises one or more of: polyacrylic acid (PAA) solution, poly (maleic acid, methyl methacrylate/methacrylic acid, butadiene/maleic acid) solutions, and water soluble PAA.

4. The method according to claim 1, wherein the electrode coating layer comprises conductive additives.

5. The method according to claim 1, wherein the current collector comprises a metal foil.

6. The method according to claim 1, wherein the metal current collector comprises one or more of a copper, tungsten, stainless steel, and nickel foil in electrical contact with the electrode coating layer.

7. The method according to claim 1, wherein the electrode coating layer comprises more than 70% silicon by weight.

8. The method according to claim 1, wherein the electrode is in electrical and physical contact with an electrolyte and the electrolyte comprises a liquid, solid, or gel.

9. The method according to claim 1, wherein the battery electrode is in a lithium ion battery.

* * * * *